United States Patent
Okada

(10) Patent No.: US 10,496,008 B2
(45) Date of Patent: Dec. 3, 2019

(54) TONER SUPPLYING MEANS AND IMAGE FORMING APPARATUS COMPRISING THE SAME

(71) Applicant: CANON KABUSHIKI KAISHA, Tokyo (JP)

(72) Inventor: Noriyuki Okada, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/111,548

(22) Filed: Aug. 24, 2018

(65) Prior Publication Data
US 2019/0064698 A1     Feb. 28, 2019

(30) Foreign Application Priority Data

Aug. 31, 2017 (JP) .................................. 2017-168071

(51) Int. Cl.
| G03G 15/08 | (2006.01) |
| G03G 15/00 | (2006.01) |
| H04N 1/23  | (2006.01) |

(52) U.S. Cl.
CPC ..... *G03G 15/0853* (2013.01); *G03G 15/5041* (2013.01); *G03G 15/5045* (2013.01); *G03G 15/5058* (2013.01); *G03G 2215/00042* (2013.01); *H04N 1/2346* (2013.01)

(58) Field of Classification Search
CPC ........... G03G 15/0853; G03G 15/5041; G03G 15/5045; G03G 2215/00042; H04N 1/2346
See application file for complete search history.

(56) References Cited

U.S. PATENT DOCUMENTS

| 8,805,221 B2 | 8/2014 | Okada |
| 9,057,985 B2 * | 6/2015 | Tanaka ............... G03G 15/0848 |
| 9,811,022 B2 | 11/2017 | Okada |
| 2003/0194245 A1 * | 10/2003 | Zaima ............... G03G 15/0855 |
| | | 399/27 |

(Continued)

FOREIGN PATENT DOCUMENTS

| JP | 10-039608 A | 2/1998 |
| JP | 2005-345961 A | 12/2005 |

OTHER PUBLICATIONS

Noriyuki Okada, U.S. Appl. No. 15/951,276, filed Apr. 12, 2018, Okada (Pub No. US 2018/0307167 A1) Pub date Oct. 25, 2018.

*Primary Examiner* — Rodney A Bonnette
(74) *Attorney, Agent, or Firm* — Venable LLP

(57) ABSTRACT

An image forming apparatus includes a developing device, an image bearing member, an image density detecting portion, a toner content detecting portion, a humidity sensor, a supplying portion, and a controller configured to control the supplying portion so that a toner content is between an upper limit and a lower limit thereof. The controller can execute setting control in which the target value of the toner content is set on the basis of an image density of a reference toner image. The controller sets the lower limit until execution of subsequent setting control, wherein the lower limit is higher when a humidity is a first humidity and an average image ratio is a first ratio than when the humidity is a second humidity higher than the first humidity and the average image ratio is a second ratio larger than the first ratio.

14 Claims, 15 Drawing Sheets

(56) References Cited

U.S. PATENT DOCUMENTS

| | | | |
|---|---|---|---|
| 2015/0177647 A1* | 6/2015 | Noguchi | G03G 15/086 |
| | | | 399/30 |
| 2016/0112580 A1* | 4/2016 | Muto | H04N 1/00023 |
| | | | 358/1.9 |
| 2016/0195832 A1* | 7/2016 | Okada | G03G 15/0849 |
| | | | 399/46 |
| 2018/0307167 A1* | 10/2018 | Okada | G03G 15/0853 |

* cited by examiner

TONER SUPPLYING MEANS AND IMAGE FORMING APPARATUS COMPRISING THE SAME

FIELD OF THE INVENTION AND RELATED ART

The present invention relates to an image forming apparatus such as a printer, a copying machine, a facsimile machine or a multi-function machine.

Conventionally, an image forming apparatus of a two-component developing system in which an electrostatic latent image formed on a photosensitive drum is developed into a visible image with a two-component developer in which non-magnetic toner and a adjust carrier are mixed with each other has been known. In the case of the two-component developing system, the toner of the developer is consumed by being subjected to development of the electrostatic latent image, and therefore, correspondingly, a toner content (a proportion of a toner weight (T) to a total weight (D) of the toner and the carrier, also referred to as a TD (ratio)) of the developer in a developing device lowers. However, the developer in which the toner content excessively lowers is liable to a lower in developing characteristic and to cause an image defect. Therefore, in order to obtain a desired image density by adjusting the toner content of the developer, toner supply control in which a supply agent (principally, the toner) is supplied as needed has been carried out (Japanese Laid-Open Patent Application (JP-A) Hei 10-039608. In an apparatus disclosed in JP-A Hei 10-039608), toner supply control in systems which are called developer density detection ATR (automatic toner replenishment), video count ATR and patch detection ATR are combined with each other has been carried out.

The developer density detection ATR is a system in which the toner content of the developer in the developing device is detected by a toner content sensor from a reflected light amount of the developer or (magnetic) permeability of the developer, and on the basis of a detection result of this toner content sensor, the toner is supplied. The video count ATR is a system in which a necessary toner amount is calculated from an output level of a digital image signal sent every pixel from a video counter and then the toner is supplied. The patch detection ATR is a system in which an image pattern (referred to as a patch image) for toner content control is formed on an image bearing member such as a photosensitive drum or an intermediary transfer belt, and the toner is supplied on the basis of an image density of the patch image detected by an optical sensor.

In the case of the apparatus disclosed in JP-A Hei 10-039608, the patch detection ATR is executed at predetermined timing, and a target value of the toner content (this value is referred to as a target TD ratio) is set on the basis of the image density of the formed patch image. Then, the toner in an amount corresponding to the set target TD ratio is supplied in the developer density detection ATR and the video count ATR.

Further, other than the above-described toner supply control, an apparatus in which an image density of each of patch images formed by changing an image forming condition is detected by an optical sensor, and on the basis of the detected image density, develop control for determining an image forming condition corresponding to a desired image density is executed has been proposed (JP-A 2005-345961).

Incidentally, in the case where continuous image formation is carried out in a condition of a low print ratio and a low humidity, a developing characteristic of the developer lowers due to an electrostatic factor resulting from a toner charge amount and a non-electrostatic factor resulting from toner. In such a case, even when the above-described conventional control disclosed in JP-A Hei 10-039608 and JP-A 2005-345961 is carried out, it was difficult to obtain a sufficient image density when an image is formed with a relatively high image density. Therefore, it is conventionally desired that an image forming apparatus capable of providing a desired image density is provided even in the case where the continuous image formation is carried out in the condition of the low print ratio and the low humidity.

SUMMARY OF THE INVENTION

A principal object of the present invention is to provide an image forming apparatus capable of stabilizing an image density even when image formation is carried out in a condition of a low print ratio and a low humidity.

According to an aspect of the present invention, there is provided an image forming apparatus comprising: a developing device configured to develop an electrostatic latent image into a toner image with a developer containing toner and a carrier; an image bearing member configured to bear the toner image formed by the developing device; an image density detecting portion configured to detect an image density of the toner image on the image bearing member; a toner content detecting portion configured to detect a toner content of the developer in the developing device; a humidity sensor configured to detect a humidity; supplying means configured to supply the developer to the developing device; and a controller configured to control the supplying means so that the toner content detected by the toner content detecting portion is a target value between an upper limit and a lower limit thereof and configured to cause the supplying means to supply the developer to the developing device, wherein the controller is capable of executing setting control in which a reference toner image for toner content control is formed on the image bearing member and the target value of the toner content is set on the basis of an image density of the reference toner image detected by the image density detecting portion, and wherein when the controller executes the setting control, the controller sets the lower limit until execution of subsequent setting control, wherein the lower limit is higher when a humidity is a first humidity and an average image ratio is a first ratio than when the humidity is a second humidity higher than the first humidity and the average image ratio is a second ratio larger than the first ratio.

Further features of the present invention will become apparent from the following description of exemplary embodiments with reference to the attached drawings.

Figure 15:
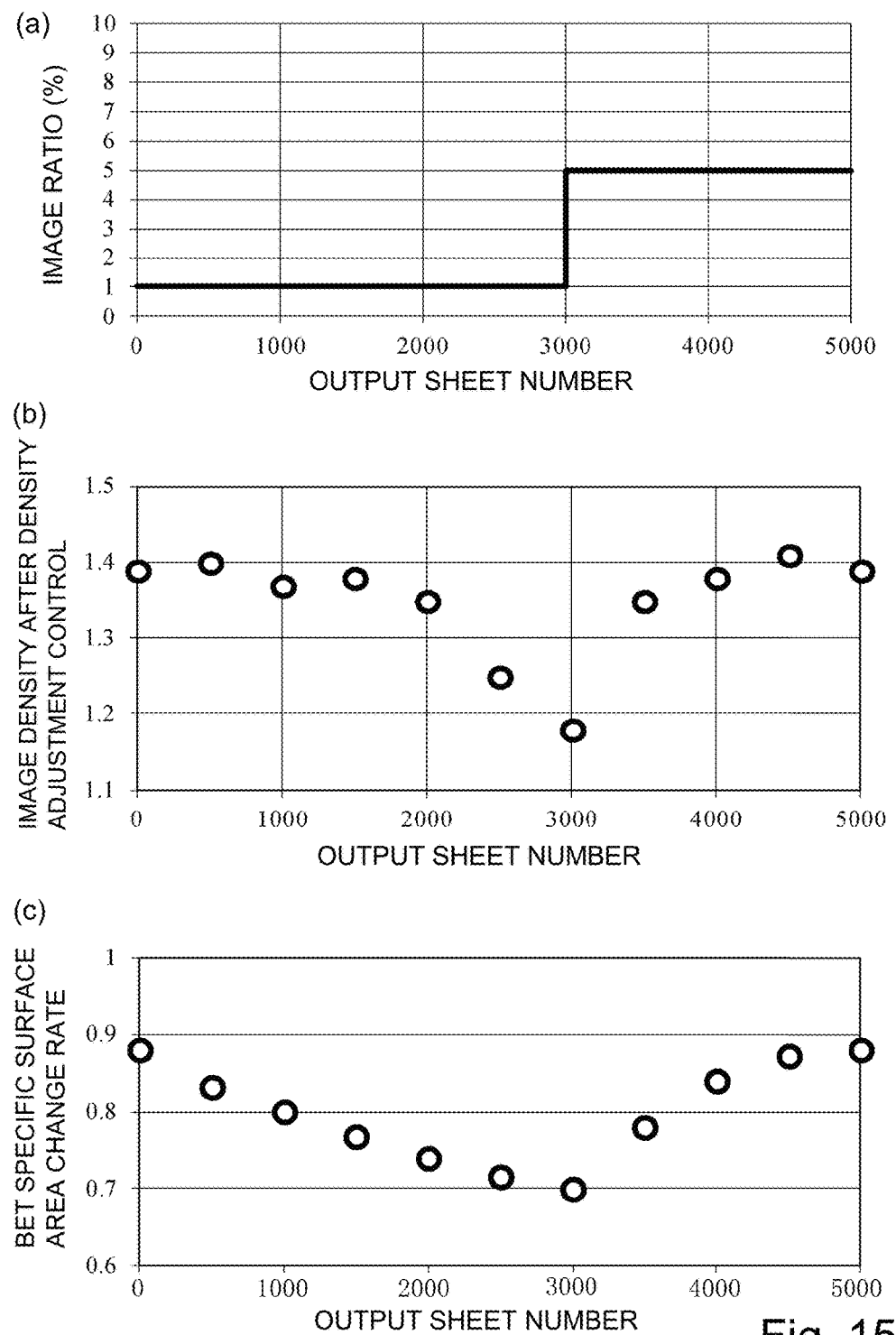

Parts (a) to (c) of FIG. 15 are graphs each showing a relationship between a parameter and an output sheet number in the case where images are continuously formed on 3000 sheets with an image ratio of 1% and then on 2000 sheets with an image ratio of 5% in an environment of 23° C. and 5% RH, in which (a) shows the relationship between an image ratio and the output sheet number, (b) shows the relationship between a solid image density after density adjusting control and the output sheet number, and (c) shows the relationship between a BET specific surface area change ratio and the output sheet number.

Figure 16:
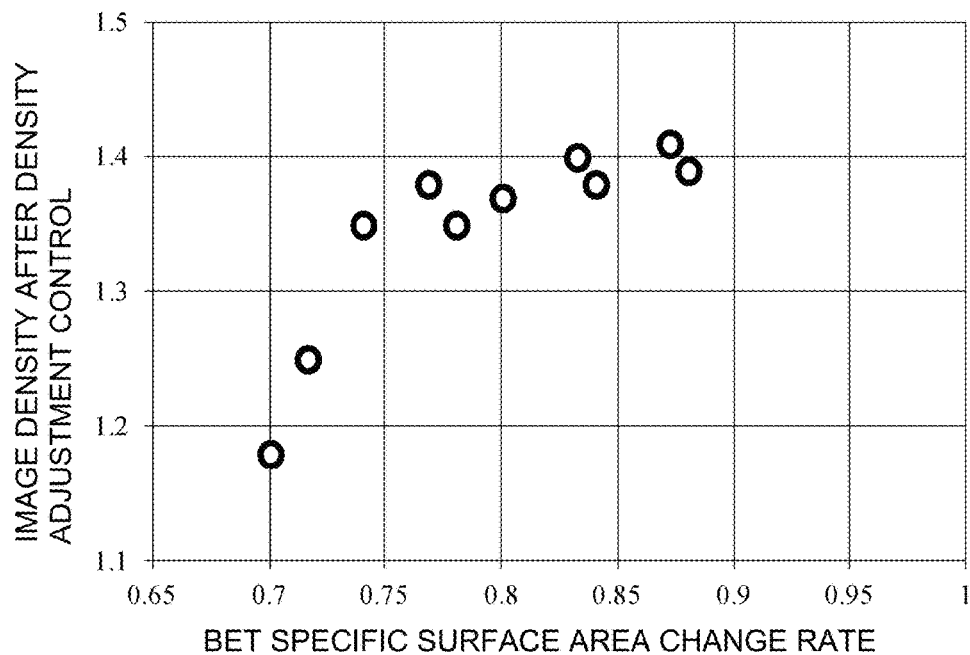

FIG. 16 is a graph showing a relationship between the BET specific surface area change ratio and the solid image density after the density adjusting control in the case of FIG. 15.

Figure 17:
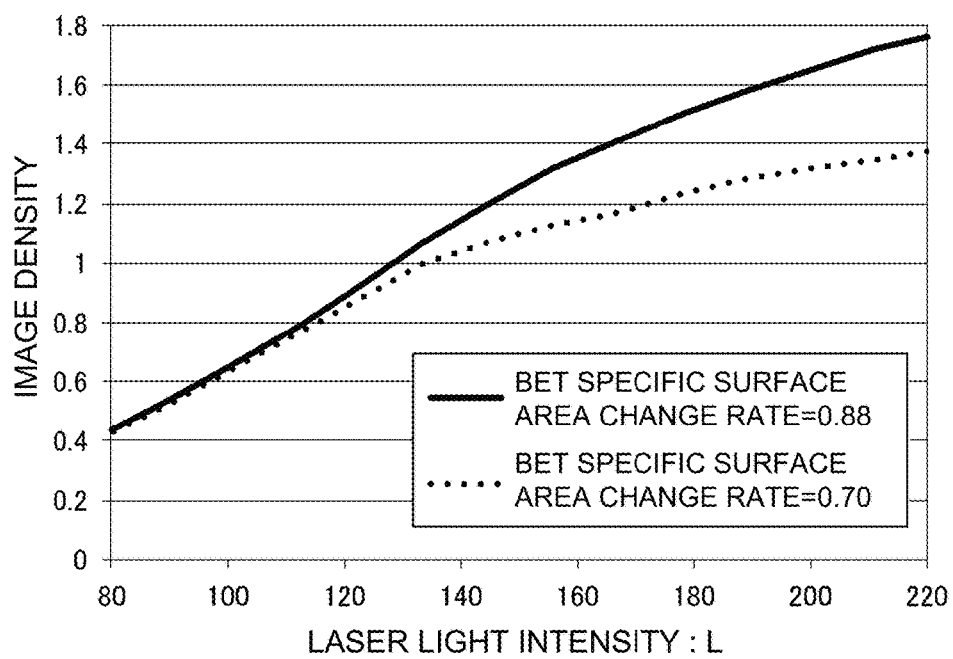

FIG. 17 is a graph showing a relationship between laser light intensity and an image density when continuous image formation is carried out in a state in which a BET specific surface area change ratio is changed in an environment of 23° C. and 5% RH.

Figure 18:
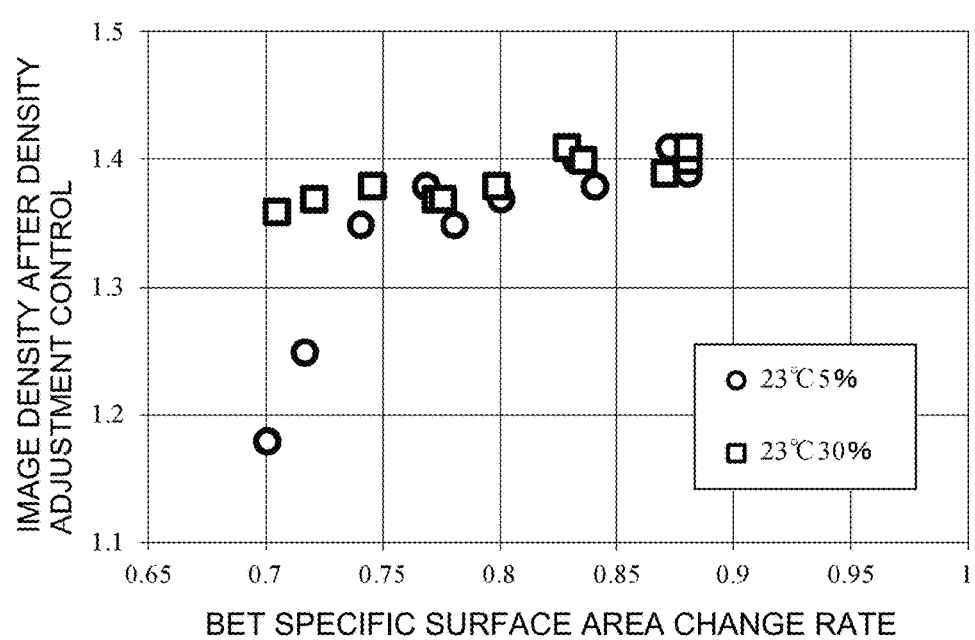

FIG. 18 is a graph which shows a relationship between the BET specific surface area change ratio and a solid image density after density adjusting control when continuous image formation is carried out in a state in which the TD ratio is changed in the environment of 23° C. and 30% RH and which also includes data of FIG. 16.

DESCRIPTION OF EMBODIMENTS

First Embodiment

[Image Forming Apparatus]

Figure 1:
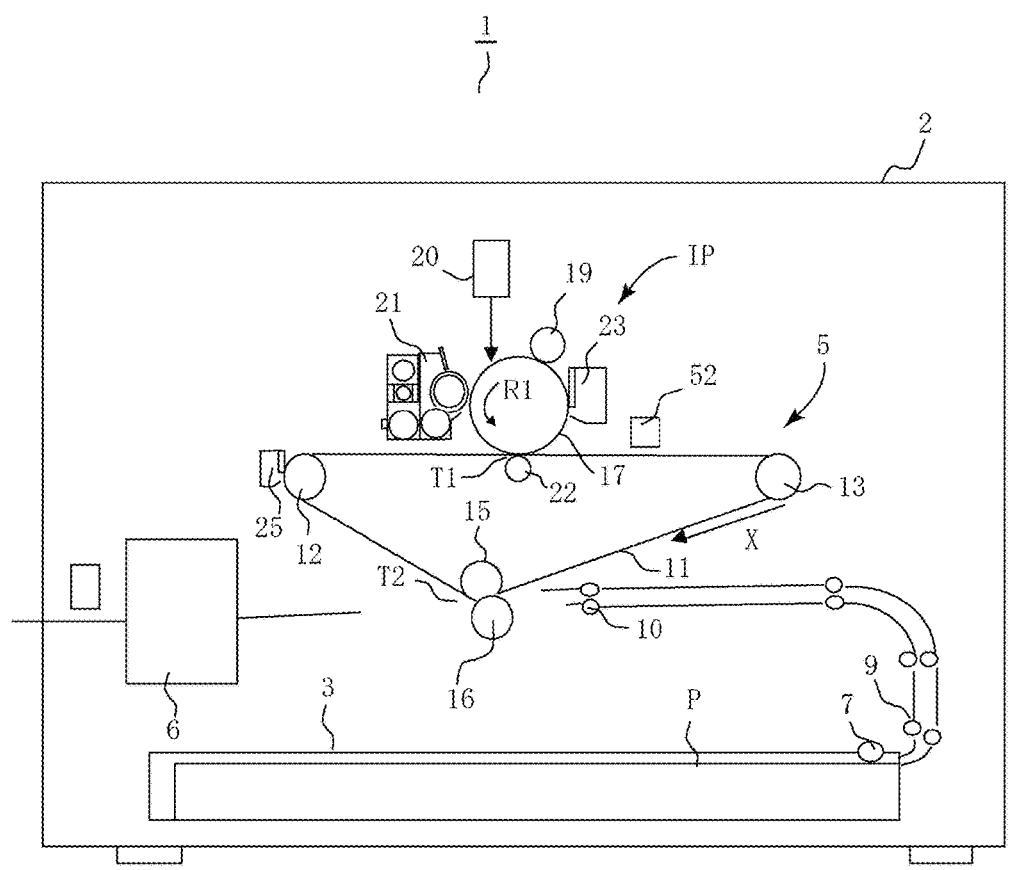
FIG. 1 is a schematic view showing an image forming apparatus of a First Embodiment.

FIG. 1 is a schematic view showing a printer 1 of a digital electrophotographic type, as an image forming apparatus according to this embodiment. The printer 1 includes an apparatus main assembly 2 and a sheet cassette 3, as a sheet accommodating portion, for accommodating sheets P at a lower portion of the apparatus main assembly. Further, above the sheet cassette 3, an image forming unit 5 for forming an image on the sheet P and a fixing device 6 for fixing a toner image on the sheet P are provided.

The sheet P stacked on the sheet cassette 3 is fed by a pick-up roller 7 constituting a sheet feeding portion and then is fed toward a registration roller pair 10 by a feeding roller pair 9. Oblique movement of the sheet P is corrected by the registration roller pair 10, and the sheet P is then fed to a secondary transfer nip T2 in synchronism with image formation timing in the image forming unit 5. At the secondary transfer portion T2, the toner image formed by the image forming unit 5 is transferred onto the sheet P and then is fed toward the fixing device 6. The sheet P on which an unfixed toner image is transferred is heated and pressed in the fixing device 6, so that the toner image is fixed on the sheet P. Thereafter, the sheet P is discharged onto a discharge tray by an unshown discharging roller.

The above-described image forming unit 5 is constituted by including an endless intermediary transfer belt 11 traveling in an arrow X direction and four image forming portions IP, provided along this intermediary transfer belt 11, for forming toner images of yellow, magenta, cyan and black. Incidentally, the four image forming portions IP have the substantially same structure except that colors of toners used for development are different from each other, and therefore, in FIG. 1, only a single image forming portion is schematically shown as a representative.

The intermediary transfer belt 11 is stretched by three rollers consisting of a driving roller 12, a tension roller 13 and an inner secondary transfer roller 15. On this intermediary transfer belt 11, the respective color toner images formed by the above-described four image forming portions are superposed and thus a full-color toner image is formed. Further, at a position opposing the inner secondary transfer roller 15, an outer secondary transfer roller 16 is provided so as to sandwich the intermediary transfer belt 11 therebetween, so that the secondary transfer nip T2 is formed between the outer secondary transfer roller 16 and the intermediary transfer belt 11. In this embodiment, an optical sensor 52 as an image density detecting means is provided so as to be capable of detecting the image density of the toner image (including a patch image) formed on the intermediary transfer belt 11 (on the image bearing member). In this embodiment, the optical sensor 52 is a reflection-type photo-sensor capable of measuring a reflected light amount by irradiating the intermediary transfer belt 11 with light and then by receiving reflected light of the light.

The image forming portion IP includes a photosensitive drum 17 which is a drum-shaped electrophotographic photosensitive member and is constituted by providing, around this photosensitive drum 17, a charging roller 19, an exposure device 20, a developing device 21, a primary transfer roller 22, a cleaning device 23 and the like. The photosensitive drum 17 includes a supporting shaft (not shown) at a center thereof and is rotationally driven by an unshown driving means.

The charging roller 19 electrically charges a surface of the photosensitive drum 17 to a predetermined polarity and a predetermined potential uniformly in contact with the surface of the photosensitive drum 17. That is, the charging roller 19 is press-contacted to the surface of the photosensitive drum 17 with a predetermined pressing force and is rotated by rotation of the photosensitive drum 17 in an arrow R1 direction. Further, to a core metal of the charging roller 19, a bias voltage is applied by a charging bias voltage source (not shown), whereby the surface of the photosensitive drum 17 is contact-charged uniformly.

In this embodiment, the bias voltage in the form of a DC voltage of 1.6 kVpp biased with an AC voltage is applied to the core metal of the charging roller 19. By applying the AC voltage, a potential on the photosensitive drum 17 can be converged to the same value as the voltage of the DC voltage. For example, the surface potential of the photosensitive drum 17 after the charging when the DC voltage is −700 V is −700 V.

Figure 2:
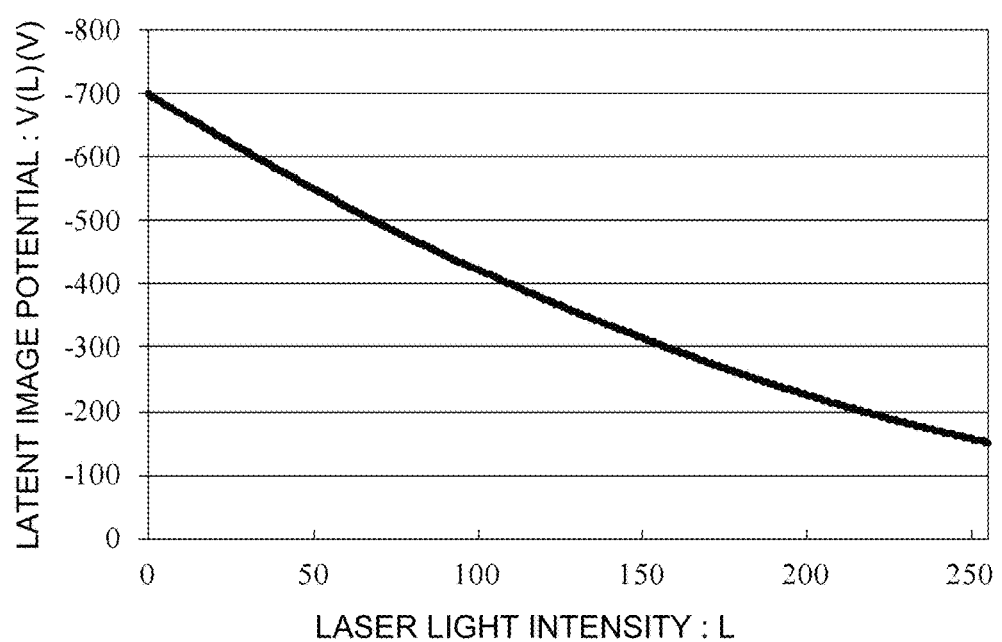
FIG. 2 is a graph showing a relationship between laser light intensity and a latent image potential on a photosensitive drum.

The exposure device 20 is disposed downstream of the charging roller 19 with respect to a rotational direction of the photosensitive drum 17 and forms an electrostatic latent image on the photosensitive drum 17 by irradiating the photosensitive drum surface with laser light depending on an image signal. Laser light intensity of the exposure device 20 can be changed in a range of 0-255, and by changing the laser light intensity, a potential (latent image potential) of the electrostatic latent image formed on the photosensitive drum 17 can be changed. Here, in this embodiment, the latent image potential on the photosensitive drum 17 when the laser light intensity is changed in the range of 0-255 is shown as V(L) in FIG. 2. As can be understood from FIG. 2, the latent image potential lowers in absolute value with increasing laser light intensity.

The developing device 21 is disposed downstream of the exposure device 20 and employs a two-component developing system using a two-component developer in which non-magnetic toner (negatively charged toner in this embodiment) and a magnetic carrier are used. The electrostatic latent image formed on the photosensitive drum 17 is developed with the toner. That is, the developing device 21 is a developing means for developing the electrostatic latent image into the toner image with the developer containing the toner and the carrier.

The primary transfer roller 22 is disposed downstream of the developing device 21 so as to oppose the photosensitive drum 17 while sandwiching the intermediary transfer belt 11 therebetween and is urged toward the photosensitive drum 17 by an urging (pressing) member such as a spring at each of end portions thereof. Further, by the primary transfer roller 22, the photosensitive drum 17 and the intermediary transfer belt 11, a primary transfer nip T1 where the toner image formed on the photosensitive drum 17 is transferred onto the intermediary transfer belt 11. In this embodiment, the intermediary transfer belt 11 corresponds to the image bearing member for bearing the toner image formed by the developing device 21 through the development.

The cleaning device 23 is disposed downstream of the primary transfer roller 22 and is constituted so as to remove the toner remaining on the developing device 17 with a cleaning blade. Incidentally, also on the intermediary transfer belt 11, a cleaning device 25 for removing the toner remaining on the intermediary transfer belt 11 with a cleaning blade is provided downstream of the inner secondary transfer roller 15 with respect to a belt rotational direction.

Figure 3:
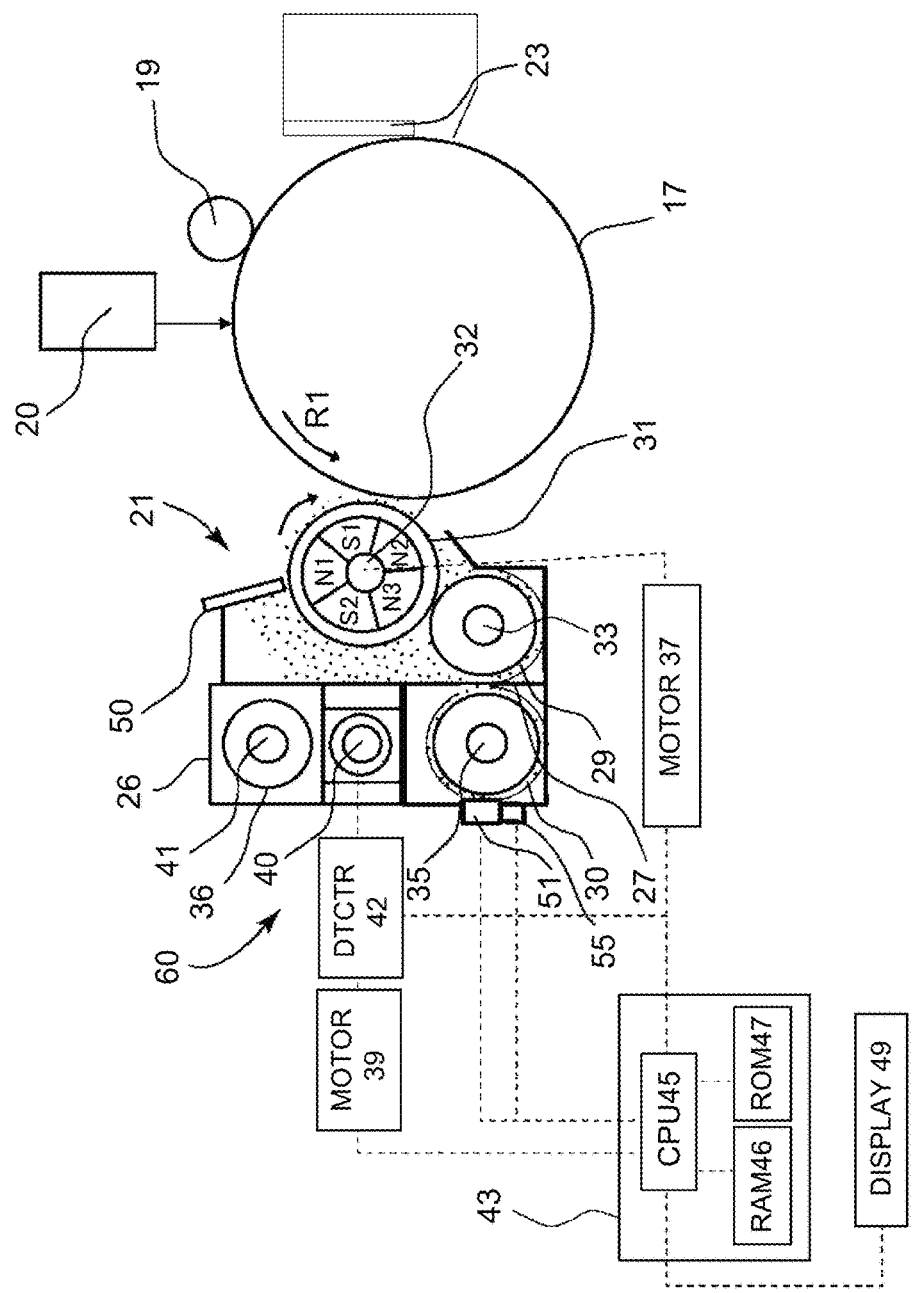
FIG. 3 is a schematic view for illustrating a developing device.

Next, the developing device 21 will be described with reference to FIG. 3. As shown in FIG. 3, in the developing device 21 using the two-component developing system, an inside of a developing container 26 for accommodating the developer is partitioned into a developing chamber 29 and a stirring chamber 30 by a partition wall 27 extending in a perpendicular direction. The developing container 26 is provided with an opening through which the developing chamber 29 partly opens, and at this opening, a non-magnetic developing sleeve 31 is provided as a developer carrying member. The developing sleeve 31 is partly exposed through the opening and opposes the photosensitive drum 17. Inside the developing sleeve 31, a magnet 32 as a magnetic field generating means is fixedly provided. The magnet 32 is roughly constituted by three or more magnetic poles, and in this embodiment, is constituted by five magnetic poles.

In addition, in the developing chamber 29 and the stirring chamber 30, first and second feeding screws 33 and 35 driven by a developing (device) driving motor 37 are provided, respectively. The partition wall 27 is provided with developer paths to establish communication between the developing chamber 29 and the stirring chamber 30 at end portions thereof on a front side and a rear side, respectively, and by rotation of the first and second feeding screws 33 and 35, the developer is circulated and fed in the developing container 26. Specifically, the first feeding screw 33 is rotated in the developing chamber 29, whereby the developer is supplied to the developing sleeve 31, and at the same time, the developer in which a toner content is lowered by consumption of the toner through the development is fed to the stirring chamber 30. Further, the second feeding screw 35 is rotated, whereby the toner supplied from a toner bottle 36 and the developer which has already been placed in the developing device 21 are stirred and fed, so that the toner content of the developer is uniformized. Then, the developer in which the toner content is restored is supplied to the developing chamber 29. In the stirring chamber 30, an inductance sensor 51 as a toner content detecting means for detecting the toner content of the developer in the developing device 21 is provided. Further, in the stirring chamber 30, a temperature and humidity sensor 55 having functions as a temperature sensor for detecting a temperature and a humidity sensor for detecting a humidity in combination is provided.

Incidentally, the above-described toner bottle 36 is mountable to the developing device 21, and a lower toner feeding screw 40 is rotated by the supplying motor 39, whereby the toner is supplied to the stirring chamber 30 of the developing device 21 through a supply opening. At this time, also an upper toner feeding screw 41 is rotated simultaneously, so that the toner existing at an upper portion is fed. In this embodiment, a supplying means 60 for supplying a supplying agent (principally the toner) to the developing device 21 is constituted by the toner bottle 36, the lower toner feeding screw 40, the upper toner feeding screw 41 and the supplying motor 39. Incidentally, rotation control of the supplying motor 39 is detectable every unit of one rotation of the screw by a rotation detecting means 42, and control in which the supplying motor 39 is driven correspondingly to a predetermined number of times of rotation of the screw is carried out by a controller 43.

The controller 43 as a control means includes, in addition to a CPU (central processing unit) 45, a RAM 46 and a ROM 47 which are used as storing means. In this embodiment, the controller 43 is capable of executing a continuous image forming job for continuously forming images on a plurality of sheets P and various control operations such as image density control and toner supply control which are described later. Further, the controller 43 is capable of detecting the toner content (TD ratio) of the toner in accordance with a detection result of the inductance sensor 51. Further, in accordance with a detection result of the optical sensor 52, the controller 43 is capable of detecting the image density of the toner image, such as the patch image, formed on the intermediary transfer belt 11. Incidentally, to the controller 43, the developing driving motor 37, the supplying motor 39 and a display device 49 (for example, a liquid crystal display panel) capable of displaying predetermined information are connected, and the controller 43 is capable of controlling these means.

The two-component developer stirred by the first feeding screw 33 in the developing device 21 is constrained by a magnetic force of a feeding magnetic pole (scooping pole)

N3 for scooping the developer and is fed by a rotation of the developing sleeve 31. Then, the developer is sufficiently constrained by a feeding magnetic pole (cutting pole) S2 having a magnetic flux density of a certain level or more and is carried on the developing sleeve 31 while forming a magnetic brush. Then, the magnetic brush (magnetic chain) is cut by a regulating blade 50, so that a layer thickness of the developer is regulated. The developer having the regulated layer thickness is fed to a developing region opposing the photosensitive drum 17 with rotation of the developing sleeve 31 while being carried by a feeding magnetic pole Ni. Then, a magnetic chain is formed by a developing pole S1 positioned in the developing region, and only the toner is transferred onto the electrostatic image (latent image) on the photosensitive drum 17 by a developing bias applied to the developing sleeve 31 by a high-voltage source (not shown), so that the toner image depending on the electrostatic image is formed on the surface of the photosensitive drum 17. For example, as the developing bias, a superposed voltage in the form of a DC voltage of −550 V biased with an AC voltage of 1.3 KVpp (10 kHz) is applied.

[Image Density Control]

In this embodiment, similarly as in the conventional constitution, the laser light intensity of the exposure device 20 is changed and a plurality of patch images different in image density are formed, and then the image density of each of the patch images transferred on the intermediary transfer belt 11 is detected by the optical sensor 52. Thereafter, on the basis of a detection result, an image forming condition is determined. Thus, image density control can be executed. This image density control (also called Dmax control) is executed by the controller 43 every time when the images are formed on a predetermined number of sheets P (every 500 sheets in this embodiment). This image density control will be described with reference to FIGS. 4 to 6.

Figure 4:
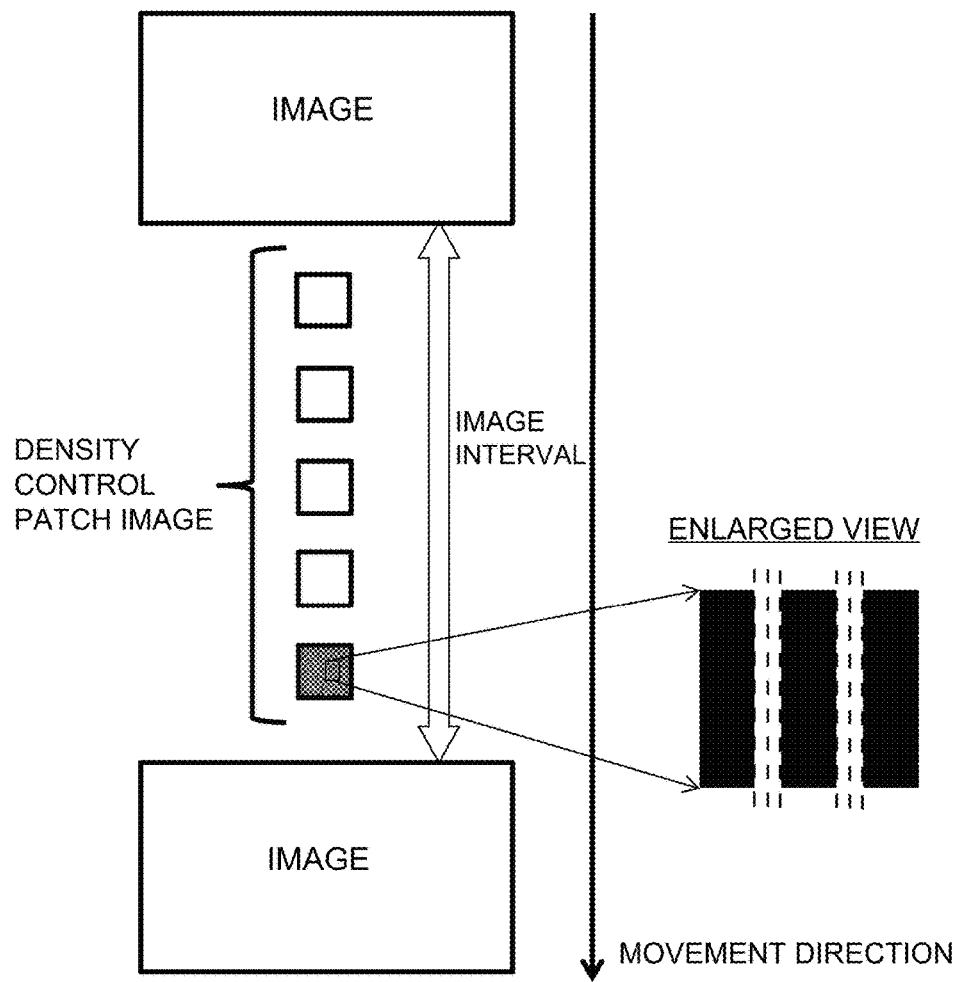
FIG. 4 is a schematic view for illustrating control in which a detection characteristic of an optical sensor is obtained.
Figure 5:
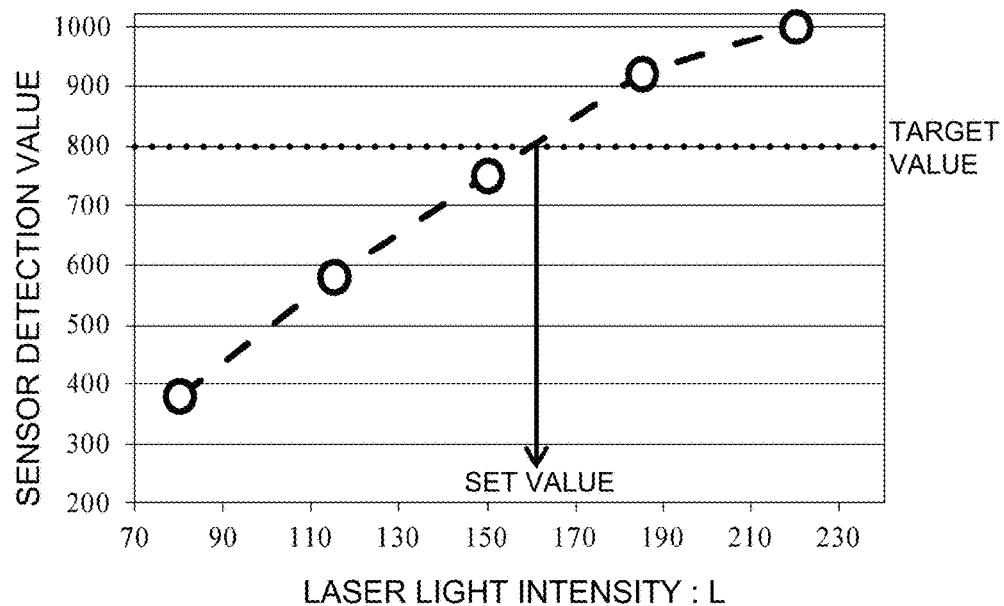
FIG. 5 is a graph showing an execution result of the control in which the detection characteristic of the optical sensor is obtained.

On the intermediary transfer belt 11, the patch images which have the same image pattern and which are different in image density are formed and arranged in a movement direction of the intermediary transfer belt 11. However, these patch images are formed so that the image density is thicker (higher) in the order from an upstream side toward a downstream side with respect to the movement direction and so that the final patch image is formed so as to have a maximum image density (also called a solid image density). As shown in FIG. 4, each of the patch images is a 4-line/2-space image in which rectilinear image segments each corresponding to 4 lines are arranged in a direction crossing the movement direction with intervals each corresponding to 2 lines. These patch images are detected by the optical sensor 52, so that a sensor detection value is acquired. FIG. 5 shows a relationship, between the laser light intensity and the sensor detection value, as a detection result in the case where 5 patch images are formed while changing the laser light intensity. In this embodiment, the sensor detection values are converted in numbers in a range of 0-1023 and are higher with a thicker (higher) image density. Then, in accordance with 5 acquired data plotted by white (open) circles in FIG. 5, an image forming condition (laser light intensity) corresponding to a desired image density is determined. In that case, the 5 acquired data are subjected to linear approximation by the method of least squares, for example, so that laser light intensity providing a desired image density can be determined.

Figure 6:
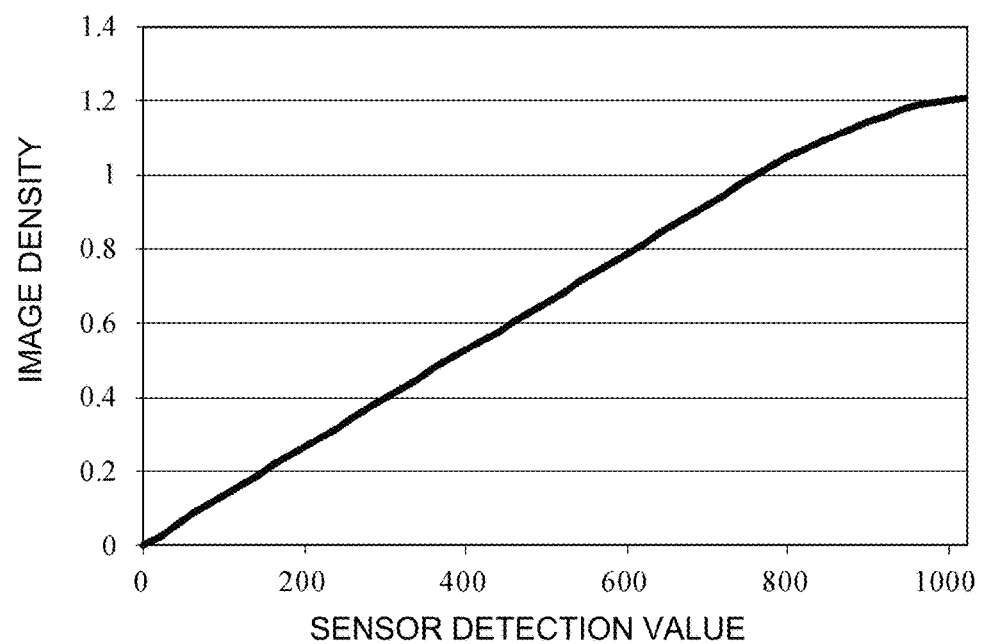
FIG. 6 is a graph for illustrating the detection characteristic of the optical sensor.

In this embodiment, as described above, the 4-line/2-space image, not a solid image is used as the patch image, but the reason why the 4-line/2-space image is used is based on a detection characteristic of the optical sensor 52. Here, a general detection characteristic of the optical sensor 52 is shown in FIG. 6. FIG. 6 shows a relationship between the sensor detection value and the image density on the sheet P in the case where the toner image which is the same as the toner image outputted on the sheet P is detected on the intermediary transfer belt 11 by the optical sensor 52.

As can be understood from FIG. 6, as the detection characteristic of the optical sensor 52, the image density is correlated with the sensor detection value until the image density (optical density (O.D.)) is about 1.0, while the correlation of the image density with the sensor detection value deviates from the linear approximation when the image density is higher than 1.0. Accordingly, even when the image density of the patch image having the image density of more than 1.0 is detected, a proper image density is not readily detected. This is because the optical sensor 52 detects a reflected light amount of the toner image on the intermediary transfer belt 11, and therefore, in the case where the image density is excessively thick (high), a difference in reflected light amount becomes small and thus the proper image density is not readily detected with high sensitivity. Thus, the optical sensor 52 can only detect the image density up to about 1.0 with high accuracy. However, in the image forming apparatus, a maximum image density is intended to be set at about 1.4. Therefore, as described above, the detection result shown in FIG. 5 is obtained by using the 4-line/2-space image, which is obtained by partially thinning out the solid image, not by using the solid image. In this case, when the laser light intensity is set at a value providing the sensor detection value of 800 (specifically, corresponding to an upper limit ("1.0") of the image density at which the optical sensor 52 can detect the image density with accuracy) in FIG. 5, in the case of the solid image, a maximum image density of 1.4 is obtained.

[Toner Supply Control: Video Count ATR, Developer Density Detection ATR]

Next, the toner supply control executed by the controller 43 will be described. The toner content of the developer in the developing device 21 lowers by development of the electrostatic latent image. For that reason, the toner supply control in which the toner is supplied from the toner bottle 36 to the developing device 21 is executed by the controller 43. By the execution of this toner supply control, the toner content of the developer is controlled at a certain level to the extent possible, or the image density is controlled at a certain level to the extent possible. In this embodiment, the toner supply amount is determined on the basis of two pieces of information. In the following, description will be made using the toner supply amount during image formation of N-th sheet as an example. First, is the video count ATR for acquiring an amount of the toner consumed by one (single) development. In the video count ATR, a video count value (Vc) is calculated from image information of an output of an N-th sheet and the calculated video count value is multiplied by a coefficient (A_Vc), so that a video count supply amount (M_Vc(N)) for the N-th sheet is calculated by a formula 1 shown below. Incidentally, the video count value Vc is determined by taking, as "1023", a value when a solid image (e.g., (whole surface) solid black image) of 100% in image ratio is outputted and varies in a range of "0-1023".

$$M\_Vc(N) = Vc \times A\_Vc \qquad \text{(formula 1)}$$

Second is the developer density detection ATR for acquiring a difference amount between the toner content during the development and a target value of the toner content. In the developer density detection ATR, first, a value of a difference between a TD ratio (TD_Indc(N−1)) calculated by a detection result of the inductance sensor 51 for an (N−1)-th sheet and a target TD ratio (T_target). Then, as shown in formula 2 below, the difference value is multiplied by a coefficient (A_Indc), so that an inductance supply amount (M_Indc(N)) is calculated. Incidentally, the coefficients (A_Vc) and (A_Indc) are stored in the ROM 47 in advance, and the target TD ratio is stored in the RAM 46 in advance.

$$M\_Indc(N)=(TD\_target-TD\_Indc(N-1))\times A\_Indc \quad \text{(formula 2)}$$

Further, a toner supply amount (M(N)) for the N-th sheet is calculated by a formula 3 below from the video count supply amount (M_Vc(N)) and the inductance supply amount (M_Indc(N)).

$$M(N)=M\_Vc(N)+M\_Indc(N)+M\_remain(N-1) \quad \text{(formula 3)}$$

In the formula 3, M_remain(N−1) is a remaining supply amount of the toner which remains without being subjected to supply during the image formation of the (N−1)-th sheet. The reason why the remaining supply amount generates is that the toner supply is executed every unit of one rotation of the screw and therefore, a supply amount less than an amount corresponding to the one rotation is integrated. In the case where the toner supply amount (M(N)) is a negative value (M(N)<0), the toner supply amount is taken as "0". That is, the toner is not supplied.

When the toner supply amount (M(N)) is acquired, the controller 43 calculates a rotation number (number of times of rotation) (B) of the supplying motor 39 from the toner supply amount (M(N)). An amount (T) of the toner supplied to the developing container 26 by one rotation of the lower toner feeding screw 40 is stored in the ROM 47 in advance, and therefore, the rotation number (B) is calculated by the following formula 4.

$$B=M/T \quad \text{(formula 4)}$$

In this embodiment, the fractional portion of the rotation number (B) acquired by the formula 4 is dropped. Further, due to a constraint of a rotational speed of the supplying motor 39, a maximum of the rotation number (B) is 5 times. The toner in an amount corresponding to fractions in the case where the rotation number (B) is 5 times or more and the fractional portion of the rotation number (B) is not supplied, and therefore the remaining supply amount (M-remain) can be represented by the following formula 5.

$$M\_remain=M-B\times T \quad \text{(formula 5)}$$

Then, the controller 43 causes the supplying motor 39 to be rotationally driven during the image formation of the N-th sheet by the rotation number (B) calculated by the formula 4. As a result, the toner in an amount corresponding to the acquired toner supply amount is supplied.

[Patch Detection ATR]

The patch detection ATR will be described using FIGS. 7 and 8 while making reference to FIGS. 1 and 3. In this embodiment, the patch detection ATR as setting control is control which is combined with the above-described toner supply control (specifically the video count ATR and the developer density detection ATR) and in which the target TD ratio (TD_target in the formula 2) used in the above-described formula 2 is set.

Figure 7:
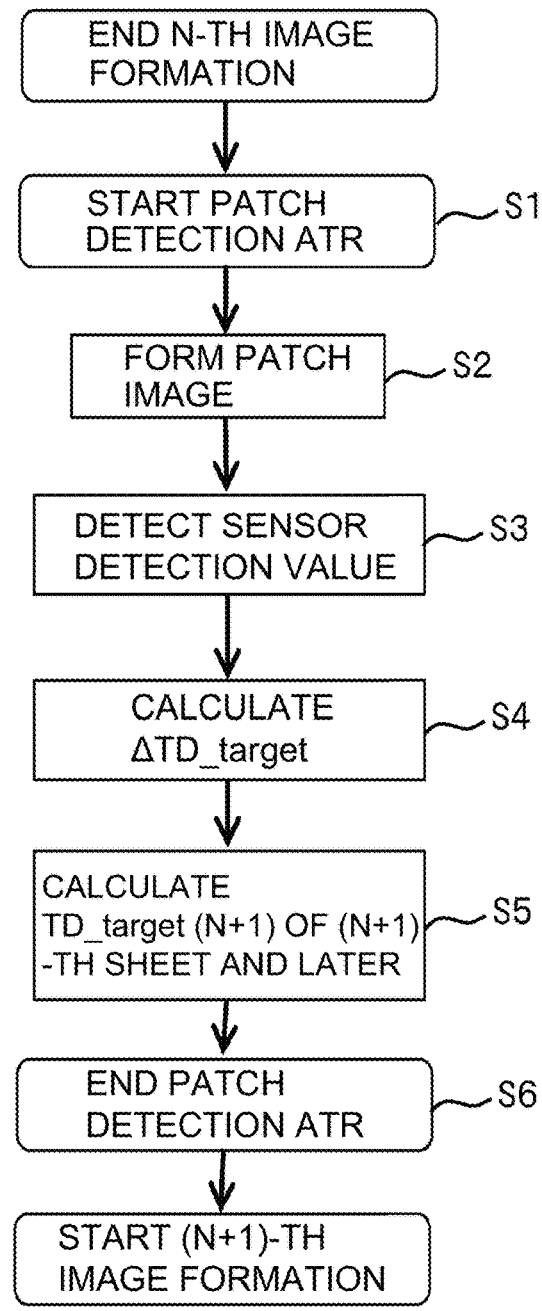
FIG. 7 is a flowchart showing patch detection ATR.
Figure 8:
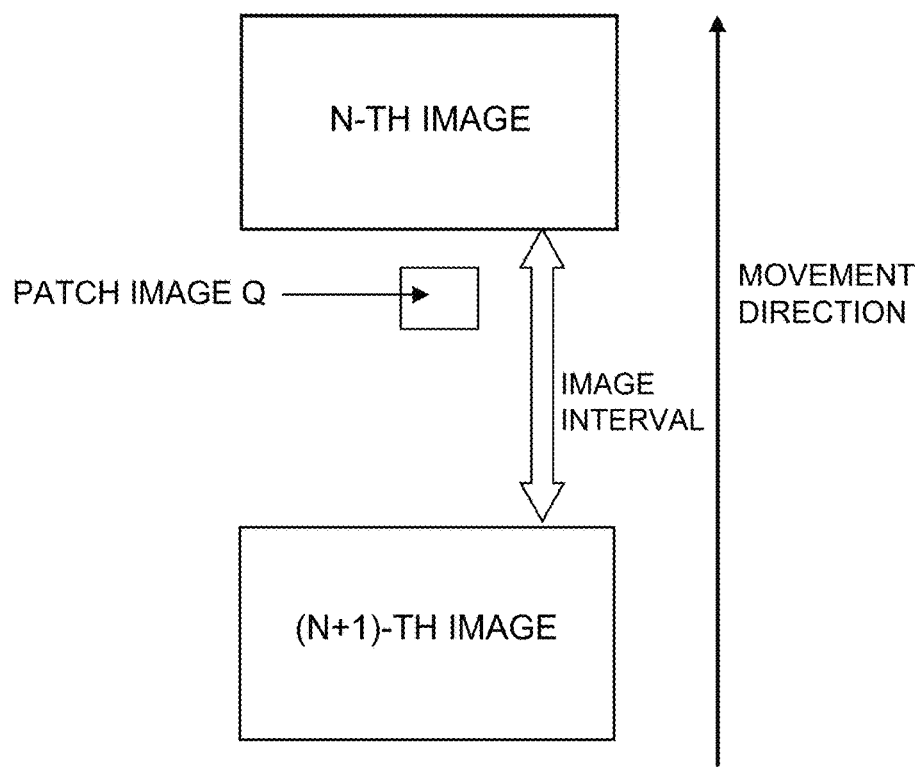
FIG. 8 is a schematic view showing a patch image.

As shown in FIG. 7, the controller 43 starts the patch detection ATR by providing a downtime before the image formation of an (N+1)-th sheet after the image formation of the N-th sheet is ended (S1). When the patch detection ATR is started, the controller 43 causes the image forming portion to form a patch image Q between an N-th image and an (N+1)-th image on the intermediary transfer belt 11 as shown in FIG. 8 (S2). Incidentally, this patch image Q is a reference image for toner content control formed from an initial state always on the basis of the same latent image irrespective of a use state (durable state) of the developing device 21.

When the patch image Q is formed, the controller 43 causes the optical sensor 52 to detect an image density (Sig_DENS) of the patch image Q (S3). The image density of the patch image Q has a tendency that a numerical value thereof becomes higher with a denser patch image Q and is converted into a numerical value in a range of "0-1023", for example. Then, the controller 43 calculates a change amount (ΔTD_target) of the TD ratio necessary to make the image density of the toner image equal to an image density at an initial state, by using the following formula 6 (S4).

$$\Delta TD\_target\{Sig\_DENS(INIT)-Sig\_DENS\}/\alpha \quad \text{(formula 6)}$$

In the formula 6, "Sig_DENS(INIT)" is the image density of the patch image Q stored in the RAM 46 when the developing device 21 is in the initial state. "α is a change amount of the image density "Sig_DENS" when the TD ratio changes by 1%. In this embodiment, "α=50, Sig_DENS(INIT)=400" was set. In this case, when the image density "Sig_DENS" is 375, the TD ratio change amount (ΔTD_target) is 0.5%, so that in order to form the patch image Q with the image density equal to the image density in the initial state, there is a need to increase the TD ratio by 0.5%.

When the TD ratio change amount (ΔTd_target) is calculated, the controller 43 calculates a target TD ratio (TD_target(N+1)) for the (N+1)-th sheet and later after the patch detection ATR, by the following formula 7 (S5).

$$TD\_target(N+1)=TD\_target(N)+\Delta TD\_target \quad \text{(formula 7)}$$

[Upper and Lower Limits of Target TD Ratio]

As described above, the patch detection ATR is capable of changing the target TD ratio (TD_target(N+1)) on the basis of the image density of an actually formed patch image Q. However, a white background fog and the like can generate in the case where the target TD ratio is excessively increased, and carrier deposition and the like can generate in the case where the target TD ratio is excessively lowered. In order to prevent these defects, in this embodiment, upper and lower limits are set for the TD ratio. As an example, the upper limit is set at 12%, and the lower limit is set at 6% (formulas 8 and 9).

$$TD\_target(N+1)=12 \text{ when } TD\_target(N+1)>12 \quad \text{(formula 8)}$$

$$TD\_target(N+1)=6 \text{ when } TD\_target(N+1)<6 \quad \text{(formula 9)}$$

Incidentally, as described above, in the image density control, in accordance with approximation on the basis of the detection result of the image density of the 4-line/2-space image by the optical sensor 52, the laser light intensity providing a described image density is determined. In this embodiment, when the laser light intensity providing the image density of 1.0 is set, the maximum image density of 1.4 can be obtained for the solid image (FIG. 5). However, in order to obtain such a maximum image density, there is a need that a correlation between the 4-line/2-space image and the solid image with respect to the image density is maintained from the initial state. That is, irrespective of the use state (durable state) of the developing device 21, a developing characteristic of the developer is required to be stabilized. When the developing characteristic lowers, particularly in the case where the image density is high, the correlation between the 4-line/2-space image and the solid image is not readily ensured.

As a factor of the lowering in developing characteristic of the developer, there is a phenomenon that an external additive on the toner surface is delivered from or buried in the toner (toner deterioration) and thus a non-electrostatic depositing force between the toner and the carrier increases, or a toner charge amount increases and thus an electrostatic depositing force between the toner and the carrier increases. The toner charge amount is liable to become large in a low-humidity environment, and the toner deterioration is liable to progress by continuous output of an image with a low image ratio. Incidentally, in this embodiment, a specific surface area of the toner is measured by the BET method, and a change rate thereof in the case where the specific surface area of the toner in the initial state is "1" is converted into a numerical value as a "BET specific surface area change ratio", and this was used as an index indicating a toner deterioration state. Accordingly, a smaller "BET specific surface area change ratio" shows that the toner deterioration progresses in a larger degree.

Here, a problem which conventionally arose will be described. FIG. 15 shows relationships of an output sheet number with an image ratio (part (a)), a solid image density after image density control (part (b)) and a BET specific surface area change ratio (part (c)) in the case where images are continuously formed on 3000 sheets with an image ratio of 1% and then on 2000 sheets with an image ratio of 5% in an environment of 23° C. and 5% RH. As can be understood from these parts (a) to (c) of FIG. 15, when the images with the image ratio of 1% are continuously outputted, the BET specific surface area change ratio gradually lowers. That is, the toner deterioration progresses. Further, up to about 2000 sheets, the solid image density (maximum image density) is maintained at about 1.4 after execution of the above-described image density control. However, when the output sheet number exceeds about 2000 sheets, the solid image density lowers. Then, when the output sheet number exceeds 3000 sheets and the images with the image ratio of 5% are outputted, the BET specific surface area change ratio increases with an increasing output sheet number, so that the solid image density after the image density control is restored.

FIG. 16 shows a correlation between the BET specific surface area change ratio and the solid image density after the image density control in the case where the images are continuously formed on 3000 sheets with the image ratio of 1% and then on 2000 sheets with the image ratio of 5% in the environment of 23° C. and 5% RH. As can be understood from FIG. 16, when the BET specific surface area change ratio decreases, the solid image density after the image density control abruptly lowers. This reason will be described using FIG. 17. FIG. 17 shows a result of an output of the solid image density in a state in which the laser light intensity is changed in each of the cases of a BET specific surface area change ratio of 0.88 (solid line) and a BET specific surface area change ratio of 0.70 (dotted line). As shown in FIG. 17, from the neighborhood of a point where the image density exceeds 1.0, there arises a difference in change of the image density relative to the laser light intensity. In the case where the BET specific surface area change ratio is 0.70 (dotted line), compared with the case where the BET-specific surface area change ratio is 0.88 (solid line), the change rate largely lowers with a denser (higher) image density. In this case, the correlation between the 4-line/2-space image and the solid image in the image density control is deviated, so that even when the laser light intensity is the same, the solid image density after the image density control lowers. In this embodiment, in the patch detection ATR, for example, the patch image Q with the image density of about 0.6 is formed. Therefore, unless there is a change between the BET specific surface area change ratios 0.88 and 0.70 in a region of the image density of 0.6, the TD ratio is not changed. That is, in the conventional case, even when the toner deterioration progresses. the toner was not supplied.

As described above, in the environment of 23° C. and 5% RH, the density after the density adjustment control lowered with the change of the BET specific surface area change ratio from 0.88 to 0.70, but in order to verify the case where the humidity increases, a verification result in the case where the humidity is changed is shown in FIG. 18. FIG. 18 showed a correlation between the BET specific surface area change ratio and the solid image density after the image density control in the case where images are continuously formed on 3000 sheets with the image ratio of 1% and then on 2000 sheets with the image ratio of 5% in an environment of 23° C. and 30% RH. As can be understood from FIG. 18, in the environment of 23° C. and 30% RH, compared with the environment of 23° C. and 5% RH, even when the BET specific surface area change ratio changes to 0.70, the solid image density after the image density control did not largely lower. This is because the humidity increases and thus the toner charge amount lowers.

By these verification results, in a situation that the BET specific surface area change ratio lowers in the low-humidity environment, the developing characteristic lowers due to increases in non-electrostatic depositing force and electrostatic depositing force between the toner and the carrier. Therefore, the correlation between the 4-line/2-space image and the solid image in the above-described image density control is deviated, so that the image density lowers. That is, in the case of a low print ratio at which the toner is liable to deteriorate and of a low humidity at which the toner charge amount is liable to become high, the image density detected by the optical sensor 52 cannot be ensured (particularly, in the case of a high humidity). Therefore, even when the 4-line/2-space image is formed as a maximum image density, the image density is not ensured (thin), and therefore, the image density is not properly provided even when the image density control in which a plurality of 4-line/2-space images different in image density are formed in a state that the laser light intensity is changed and then the image density is adjusted. In order to remedy such a situation, a lowering in BET-specific surface area change ratio may be suppressed. For that purpose, use of known "discharge control" in which the toner which is deteriorated by being subjected to development of the electrostatic latent image into the toner image between images is discharged, and on the other hand, toner is newly added would be considered. However, in the "deteriorated toner discharge control", also toner other than the deteriorated toner is discharged, so that uselessness of the toner occurs and therefore it is difficult to employ the "deteriorated toner discharge control".

In this embodiment, in the case of a situation that the developing characteristic of the developer can lower, specifically in the case where the BET specific surface area change ratio lowers in the low-humidity environment, in order to improve the developing characteristic of the developer, the toner supply was executed and thus the TD ratio was intentionally able to be increased. That is, by a lowering in toner charge amount with the increase of the TD ratio, the electrostatic depositing force between the toner and the carrier can be made lower than that before the toner supply. In that case, even in the case where the non-electrostatic depositing force between the toner and the carrier increases, i.e., even in a state that the toner is deteriorated, an increase in total depositing force by the electrostatic depositing force and the non-electrostatic depositing force can be suppressed, and thus the developing characteristic of the developer is hard to lower. Therefore, in this embodiment, by increasing the lower limit of the target TD ratio in the above-described formula 9, the influence of the toner deterioration on the image density is reduced. This will be described below.

Figure 9:
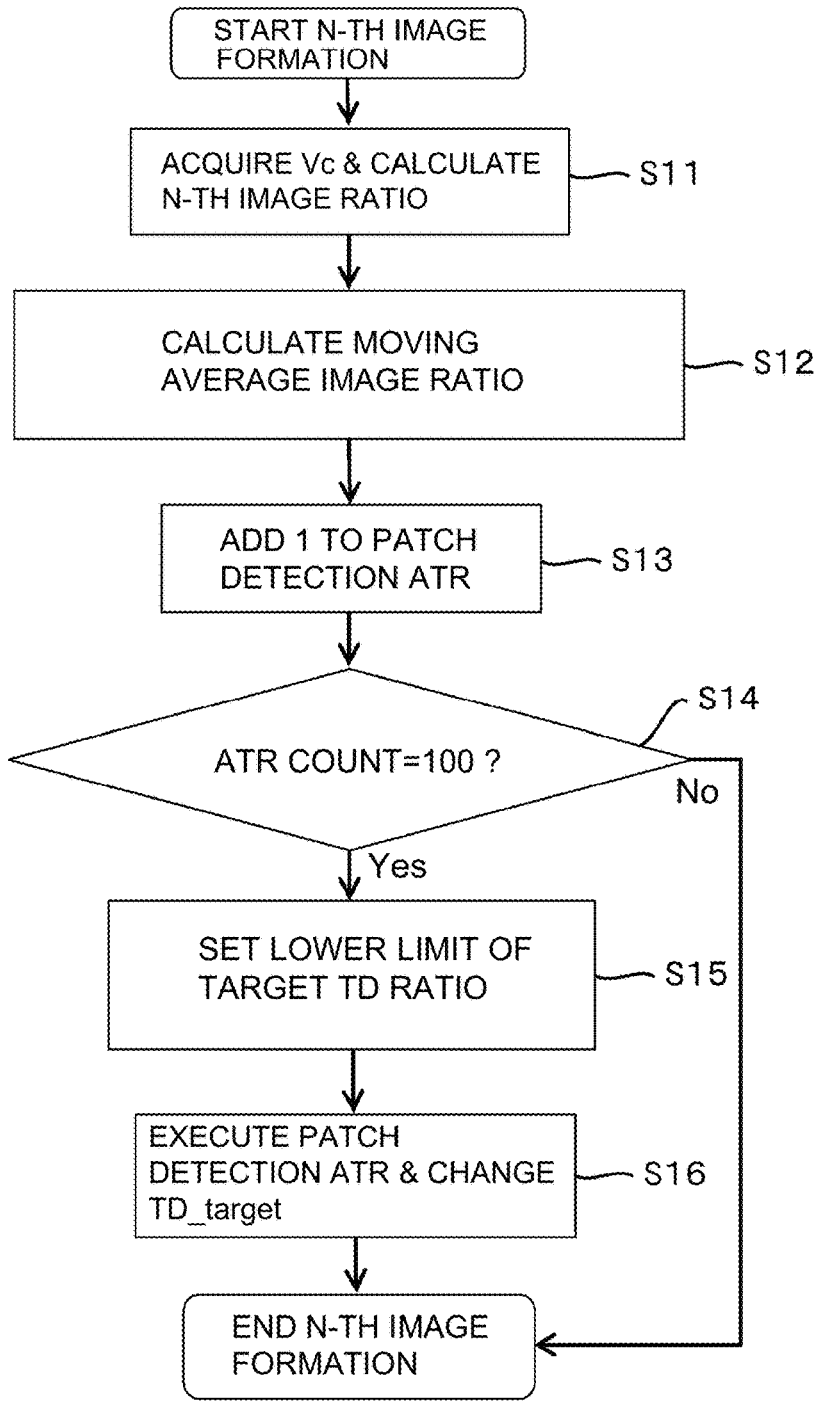
FIG. 9 is a flowchart showing a developing characteristic adjusting process in the First Embodiment.

FIG. 9 shows a developing characteristic adjusting process in this embodiment. The controller 43 acquires a video count value (Vc) of an N-th sheet during image formation of the N-th sheet and then acquires an image ratio of the N-th sheet in accordance with the following formula 10 (S11).

(Image ratio of N-th sheet)=(Video count value of N-th sheet)/10223    (formula 10)

Then, the controller acquires a moving average image ratio of the N-th sheet in accordance with a formula 11 below (S12). In the formula 11, "α" is an index of moving average, and in this embodiment, "α=500" was set. By calculating the moving average image ratio, the above-described BET specific surface area change ratio can be grasped.

(Moving average image ratio of N-th sheet)=(Moving average image ratio of (N−1)-th sheet)×(α−1)/α+(Image ratio of N-th sheet)/α    (formula 11)

Figure 10:
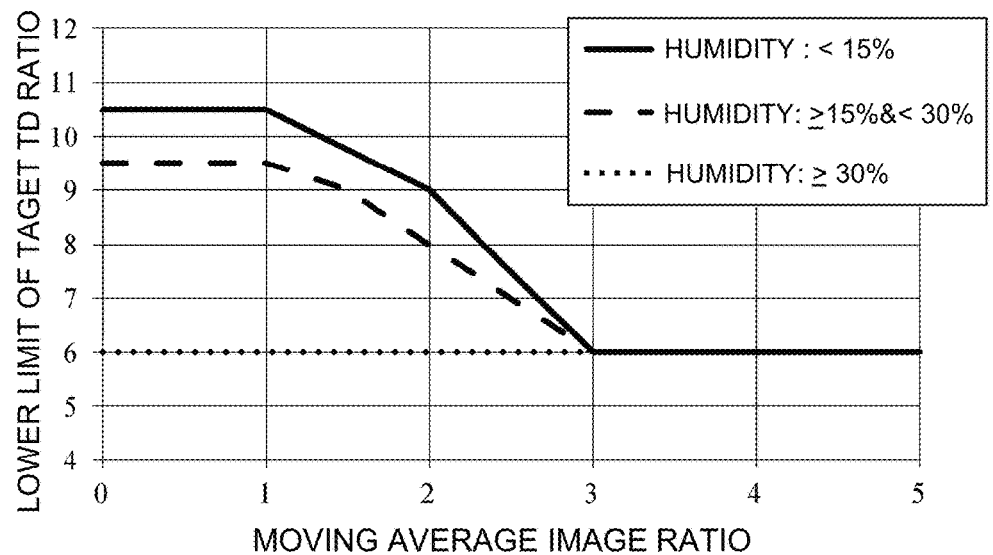
FIG. 10 is a graph showing a relationship among a moving average image ratio, a humidity and a TD ratio lower limit.

Then, the controller 43 adds "1" to a patch detection ATR count (S13) and discriminates whether or not the patch detection ATR count is "100" (S14). In the case where the patch detection ATR count is not "100" (No of S14), the controller 43 ends the developing characteristic adjusting process. On the other hand, in the case where the patch detection ATR count is "100" (Yes of S14), the controller 43 executes a process of changing a target TD ratio lower limit. Specifically, on the basis of the humidity detected by the temperature and humidity sensor 55 and the moving average image ratio of the N-th sheet acquired in the above-described S12, the controller 43 changes the lower limit (formula 9) of the target TD ratio used in the patch detection ATR (S15). At this time, the target TD ratio lower limit is acquired in accordance with a relationship shown in FIG. 10. Specifically, a table and a calculating formula and the like which reflect the relationship shown in FIG. 10 are stored in the RAM 46 and the ROM 47 in advance, so that the controller 43 is capable of acquiring the target TD ratio lower limit therefrom. As shown in FIG. 10, in this embodiment, in the case where the moving average image ratio is 1% or more and less than 3%, the target TD ratio lower limit is lowered with a lowering moving average image ratio. Further, in the case where the moving average image ratio is less than 3%, the target TD ratio is increased with a lower humidity. This target TD ratio lower limit is set so that a lower limit of the toner content until a subsequent patch detection ATR is executed is higher in the case where the humidity is a first humidity and the moving average image ratio is a first ratio than in the case where the humidity is a second humidity higher than the first humidity and the moving average image ratio is a second ratio larger than the first image ratio.

After the changing process of the lower limit of the target TD ratio (S15), the controller 43 executes the above-described patch detection ATR (FIG. 7) (S16). In this embodiment, in the case where the patch detection count is "100" (Yes of S14), i.e., every time when the images are formed on 100 sheets P, the patch detection ATR is executed. Thereafter, the controller 43 ends the developing characteristic adjusting process. Incidentally, in the case where the patch detection ATR is executed, the controller 43 sets the patch detection ATR count at "0".

Figure 11:
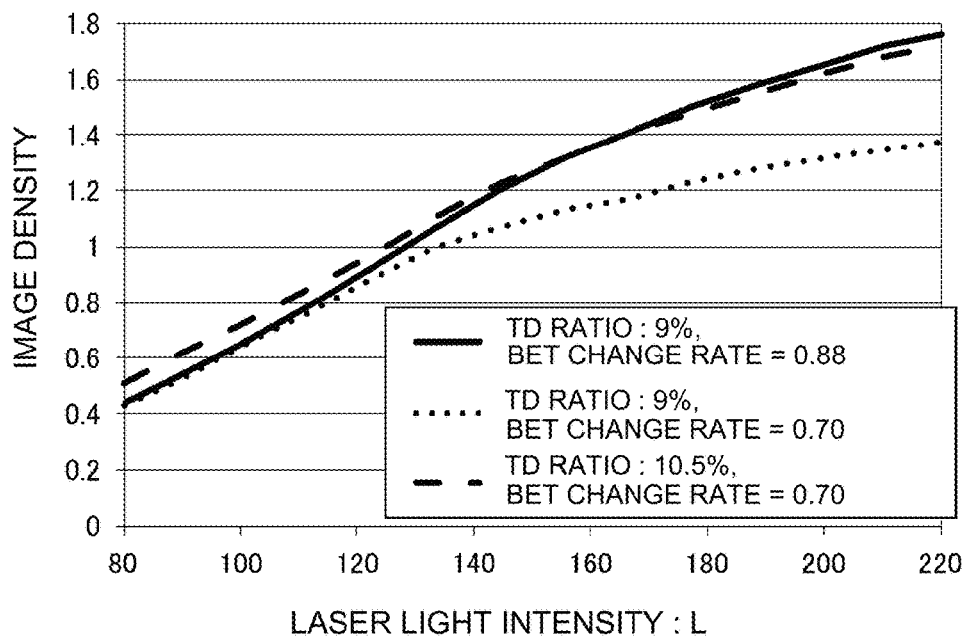
FIG. 11 is a graph showing a relationship between laser light intensity and an image density when continuous image formation is carried out in a state in which a BET specific surface area change ratio and a TD ratio are changed in an environment of 23° C. and 5% RH.

FIG. 11 shows a relationship between the laser light intensity and the image density in the case where the continuous image formation is carried out in a state that the BET specific surface area change ratio and the TD ratio are changed in the environment of 23° C. and 5% RH. In FIG. 11, a solid line represents the case where the TD ratio of 9% and the BET specific surface area change ratio of 0.88, a dotted line represents the case where the TD ratio of 9% and the BET specific surface area change ratio of 0.70, and a broken line represents the case where the TD ratio is 10.5% and the BET specific surface area change ratio is 0.70. In the case where the TD ratio is the same (9%), as can be understood from comparison between the case of the BET specific surface area change ratio of 0.88 (solid line) and the case of the BET specific surface area change ratio of 0.70 (dotted line), in the case where the BET specific surface area change ratio is small, the image density is low even when the laser light intensity is the same. Particularly, a density lowering in the case of a high image density requiring relatively large (high) laser light intensity is conspicuous. In the conventional constitution, due to this, it was difficult to acquire a sufficient image density.

On the other hand, in the case where the BET specific surface area change ratio is the same (0.70), as can be understood from comparison between the case of the TD ratio of 9% (dotted line) and the case of the TD ratio of 10.5% (broken line), in the case where the TD ratio is large, the image density is high even when the laser light intensity is the same. Particularly, a density increase in the case of the high image density requiring the relatively high laser light intensity is large, and the case where the TD ratio of 10.5% and the BET specific surface area change ratio of 0.70 (broken line) and the case here the TD ratio of 9% and the BET specific surface area change ratio of 0.88 (solid line) approximate to each other. From this, it is understood that in the case where the BET specific surface area change ratio is low, i.e., in the case of a toner deterioration state, the developing characteristic of the developer can be improved by increasing the TD ratio.

Figure 12:
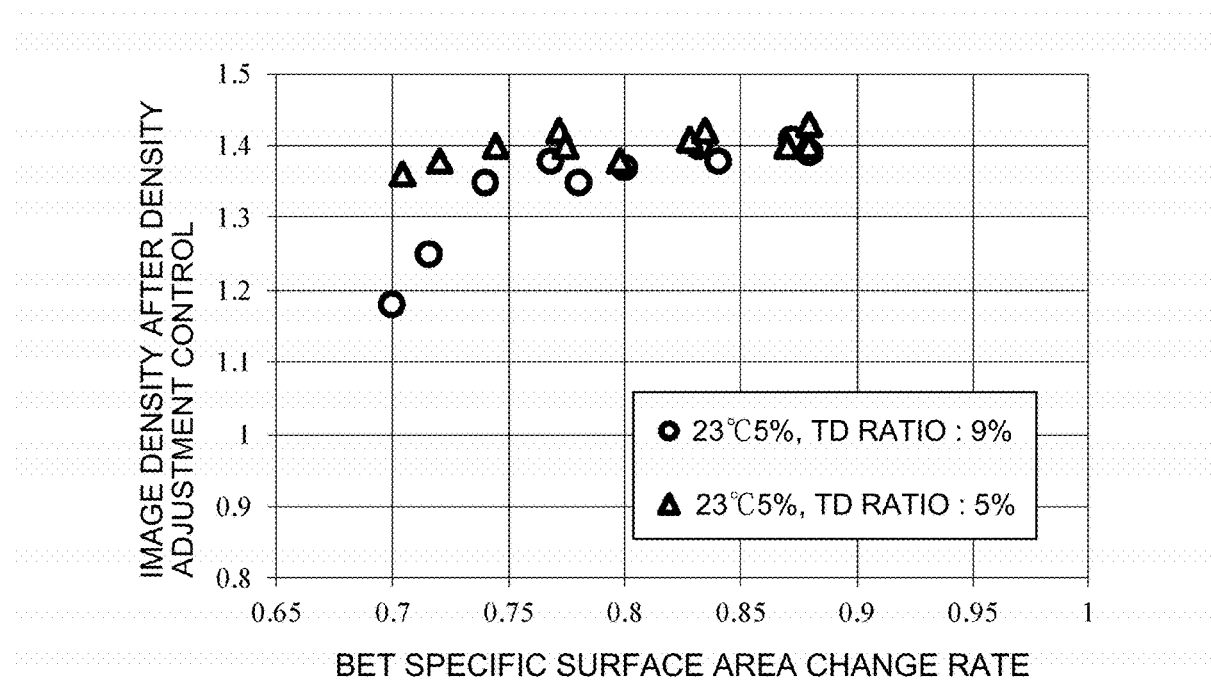
FIG. 12 is a graph showing a relationship between the BET specific surface area change ratio and a solid image density after density adjusting control when continuous image formation is carried out in a state in which the TD ratio is changed in the environment of 23° C. and 5% RH.

FIG. 12 shows a relationship between the BET specific surface area change ratio and the solid image density after the density adjustment control in the case where the continuous image formation is carried out in the state that the TD ratio is changed in the environment of 23° C. and 5% RH. As can be understood from FIG. 12, by increasing the TD ratio (from 9% to 10.5% in this embodiment), a lowering in solid image density after the image density control can be suppressed even when the BET specific surface area change ratio lowers. Therefore, in the developing characteristic adjusting process in this embodiment, a target TD ratio lower limit was made able to be changed by the humidity detected by the temperature and humidity sensor 55 and the moving average image ratio acquired by the above-described formula 11. As a result, as described above, the TD ratio can be increased (from 9% to 10.5% in this embodiment) by the toner supply, and thus even when the BET specific surface area change ratios, the lowering in solid image density after the image density control can be suppressed.

As described above, in this embodiment, the target TD ratio lower limit (formula 9) is changed on the basis of the humidity detected by the temperature and humidity sensor 55 and the moving average image ratio. As a result, particularly the lowering in solid image density after the image density control can be suppressed. That is, in the case where the toner is deteriorated, as described above, the image density "Sig_DENS" of the patch image detected by the optical sensor 52 lowers. However, in the conventional constitution, the density lowering due to the toner deterioration is not reflected. Particularly, in the case of the neighborhood of the lower limit, the target TD ratio acquired on the basis of the image density is influenced, so that the target TD ratio can be smaller than an actual TD ratio. Even when the toner is supplied in a toner supply amount determined on the basis of the target TD ratio, the image density is somewhat made thick, but is less than a desired image density, so that the image density is thin. Therefore, in this embodiment, by increasing the lower limit of the target TD ratio in the case where the moving average image ratio is low, an image density corresponding to a lowering thereof which has not been reflected in the conventional constitution is ensured. Thus, the toner supply control is executed in accordance with the target TD ratio lower limit ensuring the image density corresponding to a lowered image density with the toner deterioration, so that the developing characteristic of the developer can be improved and thus the lowering in image density after the image density control can be suppressed (FIG. 12). In other words, in this embodiment, in order to enable density adjustment in the image density control, for the purpose of lowering the toner charge amount by increasing the TD ratio when the print ratio is low and the humidity is low, the lower limit of the target TD ratio is increased in the case of the low print ratio and the low humidity. As a result, even in the case of the low print ratio and the low humidity in which the image density (particularly the high density) of the patch image detected by the optical sensor 52 was not ensured and a proper image density was not obtained by the image density control in the conventional constitution, in this embodiment, the proper image density can be obtained by the image density control in this embodiment.

Second Embodiment

Next, the Second Embodiment will be described. In this embodiment, by correcting an image density detected by the optical sensor 52 during the patch detection ATR, the toner supply amount is increased compared with the case where the image density is not corrected in the toner supply control, and thus the TD ratio is increased, so that the developing characteristic of the developer can be improved.

Figure 13:
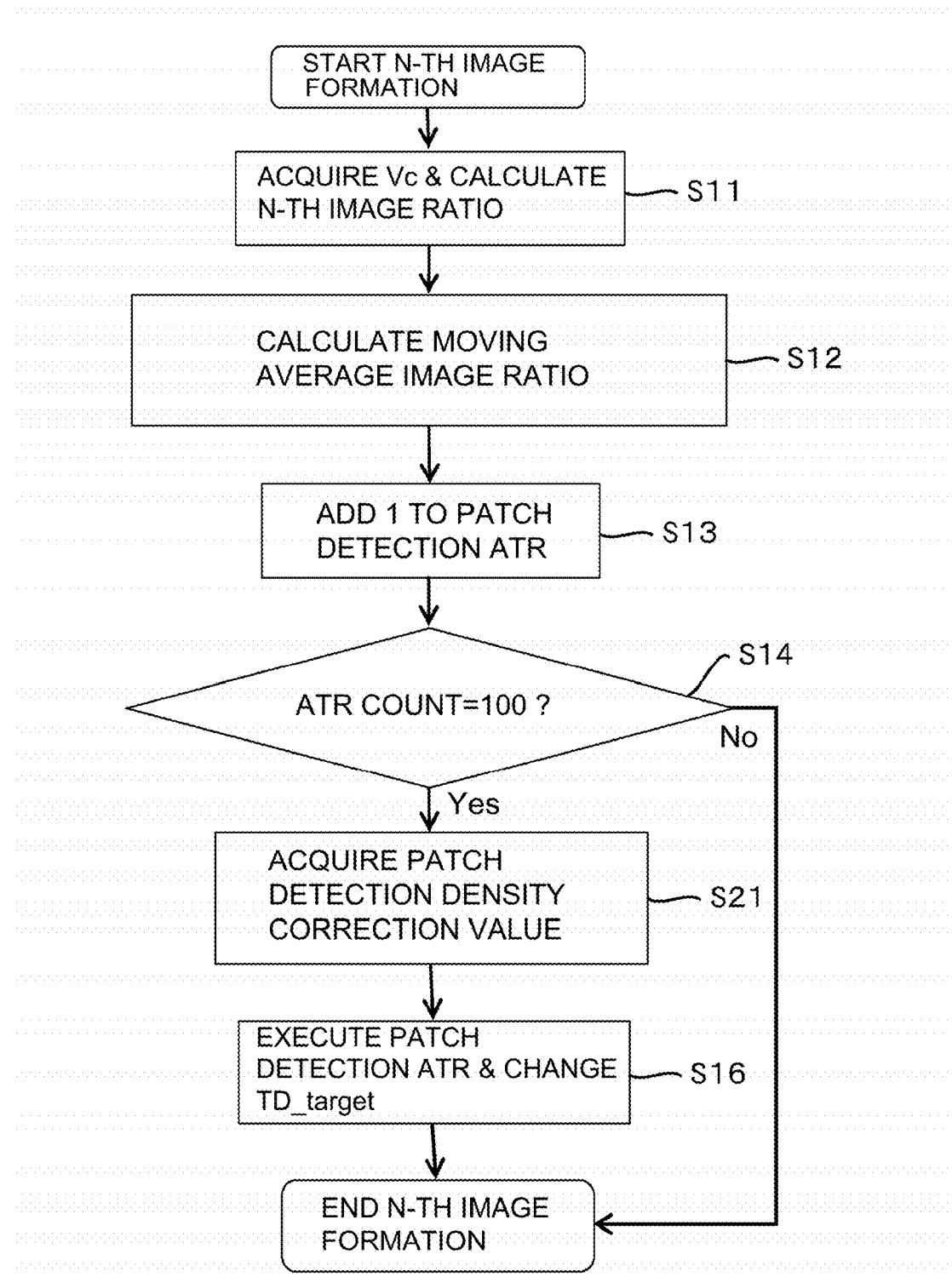
FIG. 13 is a flowchart showing a developing characteristic adjusting process in a Second Embodiment.

FIG. 13 shows a developing characteristic adjusting process in this embodiment. Incidentally, in the following, a difference from the above-described First Embodiment is principally described, and description of a constitution similar to that of the First Embodiment was simplified or omitted.

Figure 14:
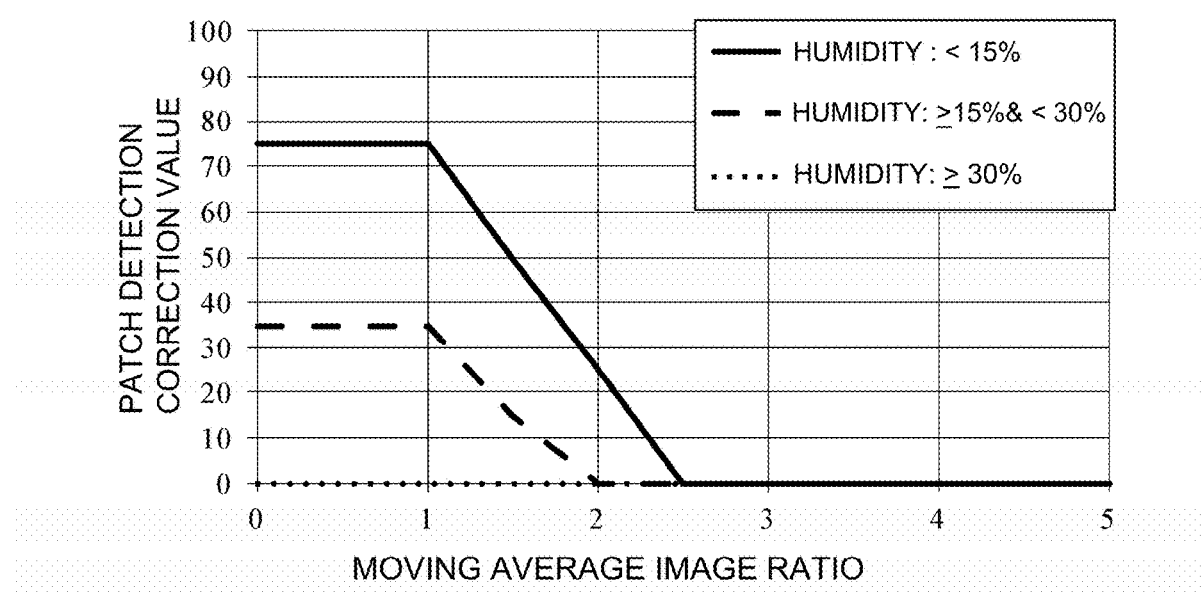
FIG. 14 is a graph showing a relationship among a moving average image ratio, a humidity and a patch detection density correction value.

As shown in FIG. 13, the controller 43 acquires an image ratio of an N-th sheet depending on a video count value (Vc) of the N-th sheet (S11) and acquires a moving average image ratio of the N-th sheet on the basis of the image ratio of the N-th sheet and the image ratio of the (N−1)-th sheet (S12). Then, "1" is added to a patch detection ATR count (S13), and when the patch detection ATR count is "100" (Yes of S14), the controller 43 executes the patch detection ATR. However, in this embodiment, the controller 43 executes a process of acquiring a patch detection density correction value ("Sig_DENS_ADJ") before execution of the patch detection ATR (S21). At this time, on the basis of the humidity detected by the temperature and humidity sensor 55 and the moving average image ratio of the N-th sheet acquired in the above-described S12, the controller 43 acquires the patch detection density correction value in accordance with a relationship shown in FIG. 14. Specifically, a table and a calculating formula and the like which reflect the relationship shown in FIG. 14 are stored in the RAM 46 and the ROM 47 in advance, so that the controller 43 is capable of acquiring the patch detection density correction value therefrom. As shown in FIG. 14, in this embodiment, in the case where the moving average image ratio is 1% or more and less than 2.5%, the patch detection density correction value is lowered with a lowering moving average image ratio. Further, in the case where the moving average image ratio is less than 2.5%, the patch detection density correction value is increased with a lower humidity.

After the patch detection density correction value is acquired as described above (S21), the controller 43 executes the patch detection (FIG. 7) (S16). However, in this embodiment, during the execution of the patch detection ATR, using the above-described patch detection density correction value (Sig_DENS_ADJ), the image density (Sig_DENS) of the patch image Q detected by the optical sensor 52 is corrected, and then the controller 43 calculates a change amount (ΔTD_target) of the TD ratio. That is, in this embodiment, the change amount (ΔTD_target) of the TD ratio is calculated by the following formula 12, not the above-described formula 6.

$$\Delta TD\_target = \{Sig\_DENS(INIT) - (Sig\_DENS - Sig\_DENS\_ADJ)\}/\alpha \quad \text{(formula 12)}$$

In this embodiment, on the basis of the corrected image density of the patch image Q, a target TD ratio (formula 7) of an (N+1)-th sheet and later after the patch detection ATR. This target TD ratio is set so that an average (value) of the toner content until a subsequent patch detection ATR is executed is higher in the case where the humidity is a first humidity and the moving average image ratio is a first ratio than in the case where the humidity is a second humidity higher than the first humidity and the moving average image ratio is a second ratio larger than the first image ratio. In order to achieve this target TD ratio, the developer density detection ATR is executed. Then, the toner in an amount corresponding to a toner supply amount (M(N), formula 3) calculated on the basis of the inductance supply amount acquired by the developer density detection ATR and the video count supply amount acquired by the video count ATR is supplied by execution of the toner supply control. Thus, in this embodiment, an effect similar to that of the above-described First Embodiment such that the toner supply control is executed in accordance with the target TD ratio lower limit ensuring the image density corresponding to a lowered image density with the toner deterioration, and thus the lowering in image density after the image density control can be suppressed is obtained.

Other Embodiments

Incidentally, in the above-described First and Second Embodiments, in order to grasp the BET specific surface area change ratio, the moving average image ratio of the N-th sheet was used, but in addition thereto, by using a temperature detected by the temperature and humidity sensor 55, the BET specific surface area change ratio can be grasped with high accuracy. The reason therefor is that when the temperature becomes high, compared with the case where the temperature is low, the toner has a characteristic such that the external additive added to the toner surface is liable to be liberated from or buried in the toner (i.e., the toner deterioration is conspicuous), depending on a kind of the toner in some cases. Accordingly, in the case where the toner having the characteristic such that the external additive is liable to be liberated from or buried in the toner is used, use of the moving average image ratio of the N-th sheet and the temperature detected by the temperature and humidity sensor 55 is effective. For example, in the case where the temperature is a second temperature higher than a first temperature, the target TD ratio lower limit (or the patch detection density correction value) may also be made larger than that at the first temperature. Or, in the case where the temperature is the second temperature, the value may also be added so that the target TD ratio lower limit (or the target TD ratio) acquired depending on the moving average image ratio and the humidity when the temperature is the first temperature Further, in the above-described First and Second Embodiments, in order to grasp the toner charge amount, the humidity detected by the temperature and humidity sensor 55, was used, but in addition thereto, by using an operation time of the developing device 21, the toner charge amount can be grasped with high accuracy. The reason therefor is that a time in which the toner and the carrier are fed while being stirred becomes long in proportion to the operation time of the developing device 21, and in that case, there is a tendency that the toner charge amount becomes high. For example, in the case where the operation time is a second operation time longer than a first operation time, the target TD ratio lower limit (or the target TD ratio longer) may also be made larger than that at the first operation time. Or, in the case where the operation time is the second operation time, the value may also be added so that the target TD ratio lower limit (or the target TD ratio) acquired depending on the moving average image ratio and the humidity when the temperature is the first operation time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-168071 filed on Aug. 31, 2017, which is hereby incorporated by reference herein in its entirety.

What is claimed is:

1. An image forming apparatus comprising:
a developing device configured to develop an electrostatic latent image into a toner image with a developer containing toner and a carrier;
an image bearing member configured to bear the toner image formed by said developing device;
an image density detecting portion configured to detect an image density of the toner image on said image bearing member;
a toner content detecting portion configured to detect a toner content of the developer in said developing device;
a humidity sensor configured to detect a humidity;
supplying means configured to supply the developer to said developing device; and
a controller configured to control said supplying means so that the toner content detected by said toner content detecting portion is a target value between an upper limit and a lower limit thereof and configured to cause said supplying means to supply the developer to said developing device,
wherein said controller is capable of executing setting control in which a reference toner image for toner content control is formed on said image bearing member and the target value of the toner content is set on the basis of an image density of the reference toner image detected by said image density detecting portion,
wherein when said controller executes the setting control, said controller sets the lower limit until execution of subsequent setting control based on the humidity detected by said humidity sensor and an average image ratio,
wherein the lower limit is higher when the humidity is a first humidity and the average image ratio is a first ratio than when the humidity is a second humidity higher than the first humidity and the average image ratio is a second ratio larger than the first ratio, and
wherein when the humidity is not less than a predetermined value, the lower limit is not changed irrespective of the average image ratio.

2. An image forming apparatus according to claim 1, further comprising a temperature sensor configured to detect a temperature,
wherein said controller sets the lower limit based on the humidity, the average image ratio, and the temperature detected by said temperature sensor.

3. An image forming apparatus according to claim 1, wherein said controller measures an operation time of said developing device and sets the lower limit based on the humidity, the average image ratio, and the operation time.

4. An image forming apparatus according to claim 1, wherein the average image ratio is an average image ratio of an image formed during the setting control.

5. An image forming apparatus according to claim 1, wherein said image density detecting portion is an optical sensor receiving reflected light of light with which said image bearing member is irradiated.

6. An image forming apparatus according to claim 1, wherein said toner content detecting portion is an inductance sensor.

7. An image forming apparatus according to claim 1, further comprising a photosensitive member on which the electrostatic latent image is to be formed,
wherein said image bearing member is an intermediary transfer member onto which the toner image formed by developing the electrostatic latent image, formed on said photosensitive member, by said developing device is to be transferred.

8. An image forming apparatus comprising:
a developing device configured to develop an electrostatic latent image into a toner image with a developer containing toner and a carrier;
an image bearing member configured to bear the toner image formed by said developing device;
an image density detecting portion configured to detect an image density of the toner image on said image bearing member;
a toner content detecting portion configured to detect a toner content of the developer in said developing device;
a humidity sensor configured to detect a humidity;
supplying means configured to supply the developer to said developing device; and
a controller configured to control said supplying means so that the toner content detected by said toner content detecting portion is a target value between an upper limit and a lower limit thereof and configured to cause said supplying means to supply the developer to said developing device, wherein said controller is capable of executing setting control in which a reference toner image for toner content control is formed on said image bearing member and the target value of the toner content is set on the basis of an image density of the reference toner image detected by said image density detecting portion, wherein when said controller executes the setting control, said controller sets the lower limit until execution of subsequent setting control based on the humidity detected by said humidity sensor and an average image ratio, wherein the lower limit is higher when the humidity is a first humidity and the average image ratio is a first ratio than when the humidity is a second humidity higher than the first humidity and the average image ratio is a second ratio larger than the first ratio, and wherein when the average image ratio is not less than a predetermined value, the lower limit is not changed irrespective of a value of the humidity.

9. An image forming apparatus according to claim 8, further comprising a temperature sensor configured to detect a temperature, wherein said controller sets the lower limit based on the humidity, the average image ratio, and the temperature detected by said temperature sensor.

10. An image forming apparatus according to claim 8, wherein said controller measures an operation time of said developing device and sets the lower limit based on the humidity, the average image ratio, and the operation time.

11. An image forming apparatus according to claim 8, wherein the average image ratio is an average image ratio of an image formed during the setting control.

12. An image forming apparatus according to claim 8, wherein said image density detecting portion is an optical sensor receiving reflected light of light with which said image bearing member is irradiated.

13. An image forming apparatus according to claim 8, wherein said toner content detecting portion is an inductance sensor.

14. An image forming apparatus according to claim 8, further comprising a photosensitive member on which the electrostatic latent image is to be formed, wherein said image bearing member is an intermediary transfer member onto which the toner image formed by developing the electrostatic latent image, formed on said photosensitive member, by said developing device is to be transferred.

* * * * *